Sept. 6, 1955 E. W. ROBERTSON 2,716,752
RINGING DEVICE FOR CATTLE
Filed Oct. 21, 1954 4 Sheets-Sheet 1

Elvin W. Robertson
INVENTOR
BY C A Snow & Co.
ATTORNEYS

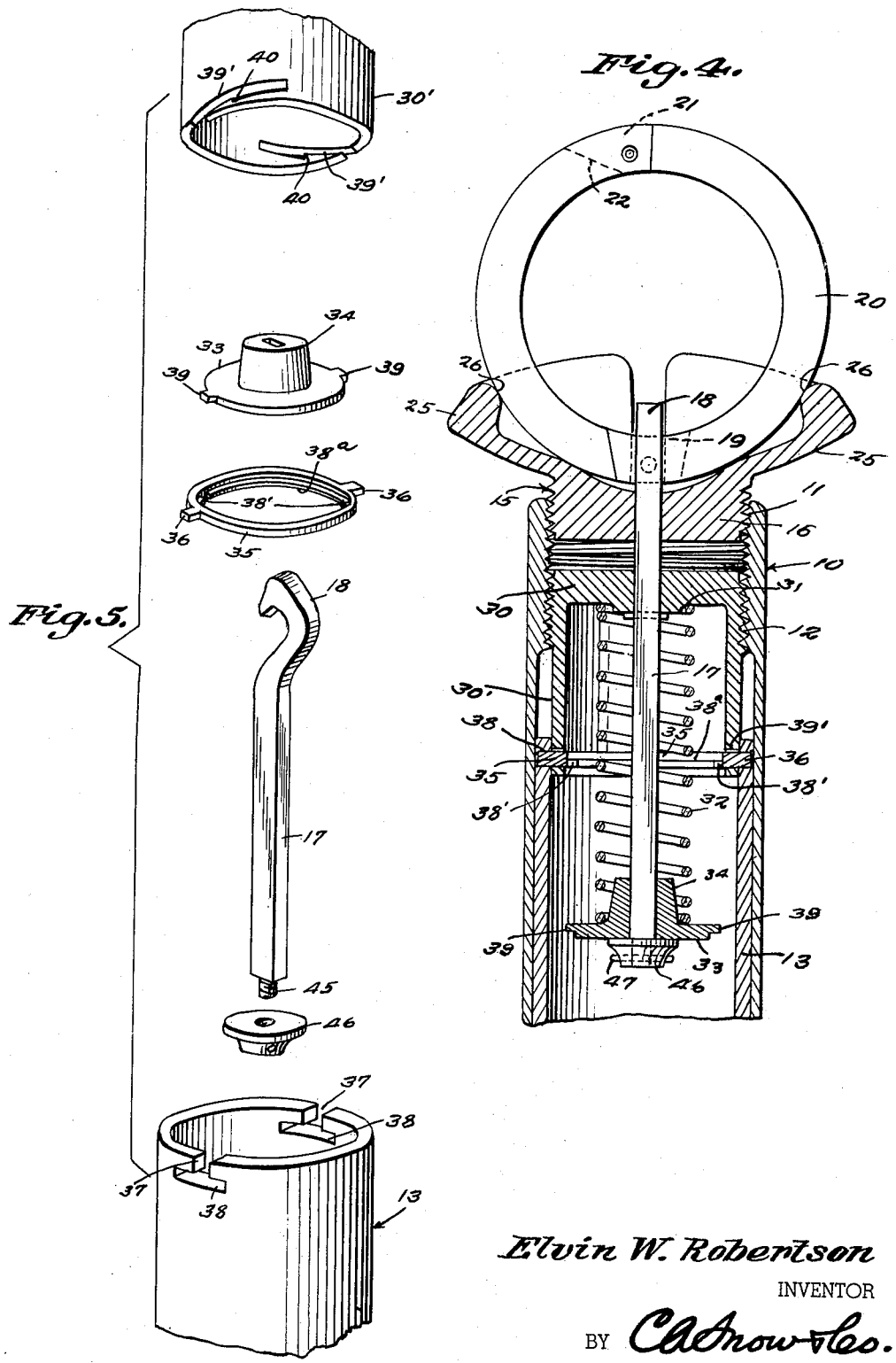

Sept. 6, 1955 E. W. ROBERTSON 2,716,752
RINGING DEVICE FOR CATTLE
Filed Oct. 21, 1954 4 Sheets-Sheet 3
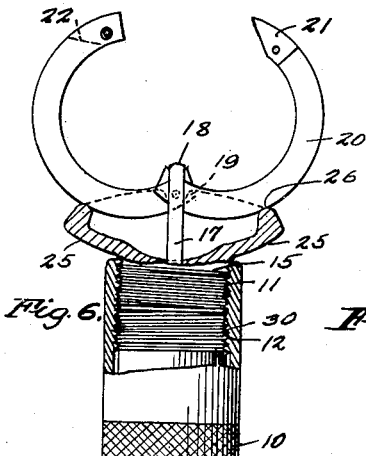
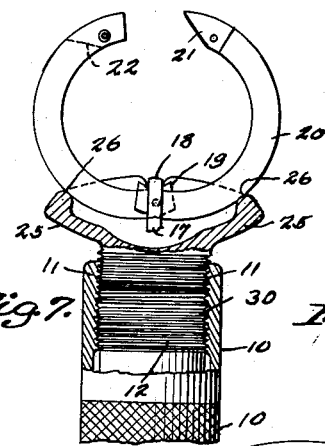
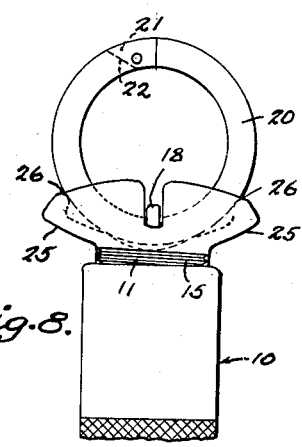
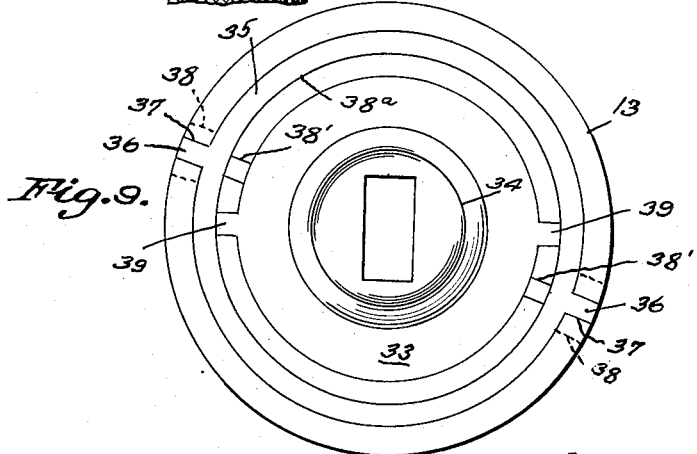
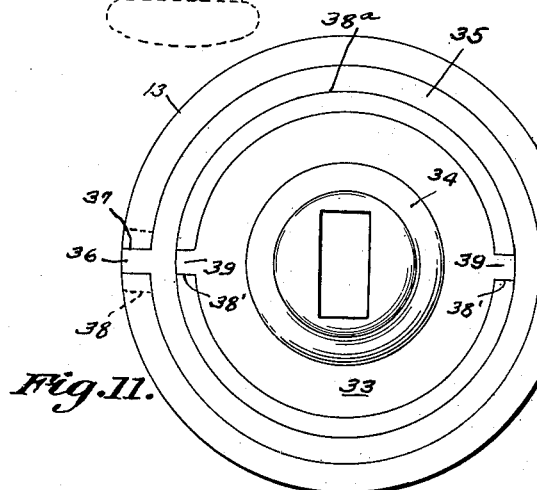
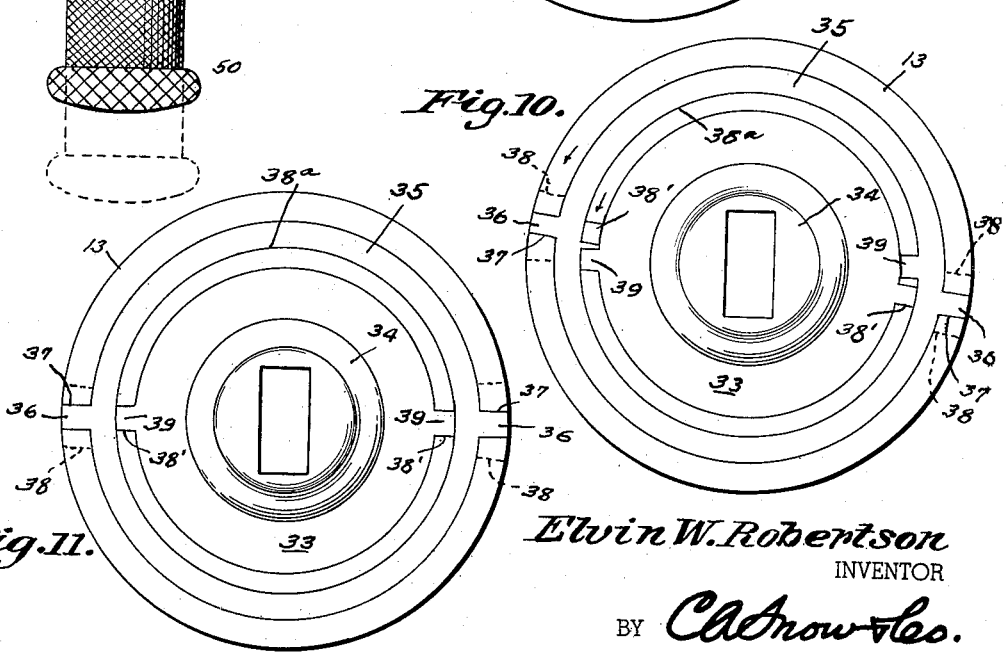
Elvin W. Robertson
INVENTOR
BY C.A. Snow & Co.
ATTORNEYS.

Sept. 6, 1955     E. W. ROBERTSON     2,716,752
RINGING DEVICE FOR CATTLE
Filed Oct. 21, 1954     4 Sheets-Sheet 4
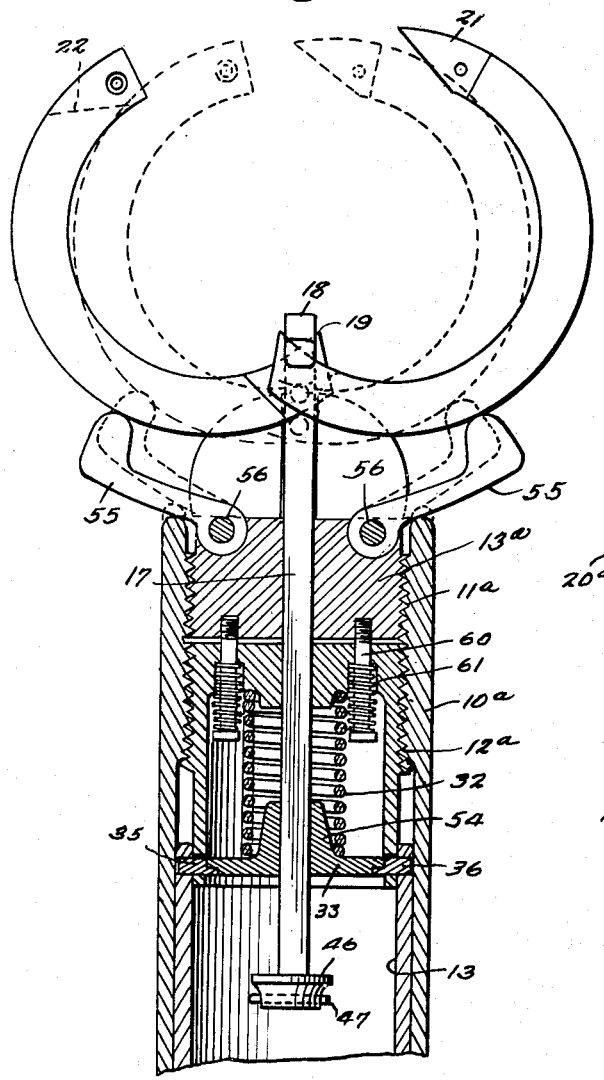
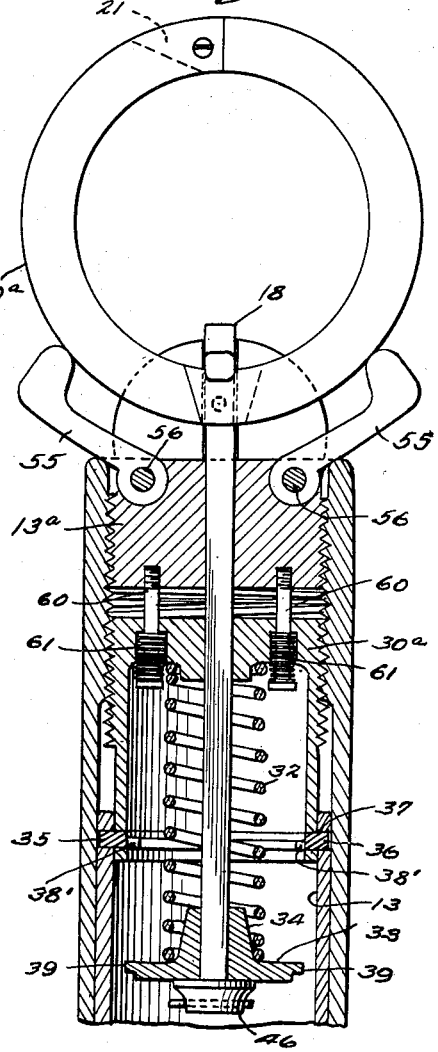
Elvin W. Robertson
INVENTOR

United States Patent Office 2,716,752
Patented Sept. 6, 1955

2,716,752

RINGING DEVICE FOR CATTLE

Elvin W. Robertson, Warrenton, Va.

Application October 21, 1954, Serial No. 463,775

7 Claims. (Cl. 1—260)

This invention relates to a ringing device for cattle, and has as its primary object the provision of an improved means for inserting a ring into the nose of a bull, as a restraining means.

An additional object of the invention is the provision of such a device whereby such a ring may be inserted with a minimum of effort, difficulty and pain to the animal.

A further object of the invention is the provision of a device of this character wherein the ring may be inserted and perforated through the membrane of the nose of the animal substantially instantaneously, thus obviating severe pain to the animal, as has hitherto been common in heretofore utilized methods.

As conducive to a clearer understanding of this invention, it may here be pointed out that in certain animals, such as bulls, hogs, or the like, it is necessary for the proper handling of the animal that a ring be inserted in the nose of the animal, which ring may by manipulation be employed to govern the action of the animal. Heretofore it has been necessary, in order to insert such a ring, preferably of the split type, to perforate the membrane separating the nostrils of the animal, which has in the past been a painful and time-consuming procedure.

A very important object of this invention is, therefore, the provision of a means whereby the ring to be inserted in the nose of the animal may be applied substantially instantaneously and without undue discomfort and pain to the animal.

Still further objects of the invention reside in the combinations of elements, arrangements of parts, and features of construction, all as will be more fully pointed out hereinafter and disclosed in the accompanying drawings.

In the drawings:

Figure 4 is a fragmentary view similar to Figure 1 but showing the parts in a different position of adjustment.

Figure 5 is an exploded perspective view showing the elements of Figures 1 and 4 in disassociated relationship.

Figure 6 is a view similar to Figure 1, on a reduced scale, disclosing the ring adapted to be positioned in the nostrils of a beast such as a bull or the like, in fully open position.

Figure 7 is a view similar to Figure 6, parts thereof being broken away, showing the parts in semi-closed relationship.

Figure 8 is a view similar to Figure 7, parts thereof being disclosed in elevation showing the ring in fully closed position.

Figure 9 is an enlarged semi-diagrammatic detail of the structure of Figure 1 in plan, showing certain of the parts in a particular position of adjustment.

Figure 10 is a view similar to Figure 9 but showing a different position of adjustment.

Figure 11 is a view similar to Figures 9 and 10 but showing the parts in a position of complete release engagement.

Figure 1:
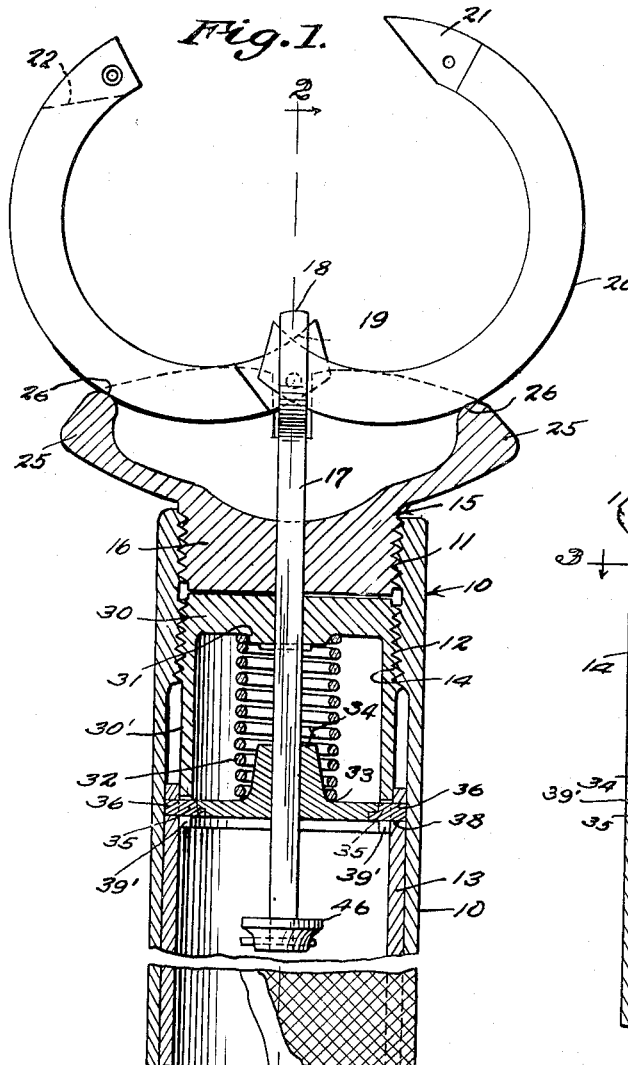
Figure 1 is a side sectional view, partially broken away, and partially shown in elevation, of one form of the device embodying the instant inventive concept, shown in pre-operative position.
Figure 2:
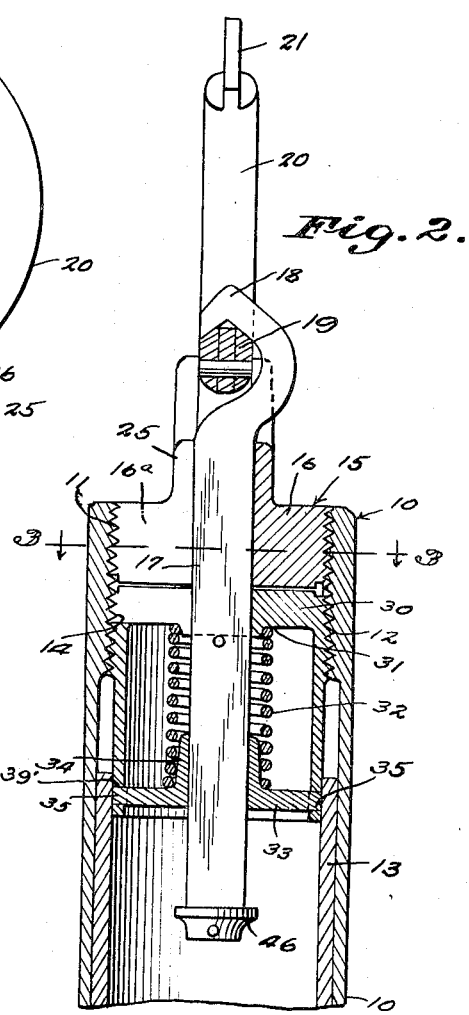
Figure 2 is a fragmentary sectional view taken substantially along the line 2—2 of Figure 1 as viewed in the direction indicated by the arrows.
Figure 3:
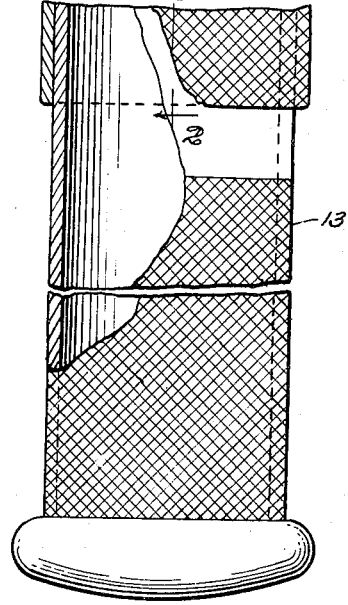
Figure 3 is a sectional view taken substantially along the line 3—3 of Figure 2 as viewed in the direction indicated by the arrows.

Figure 12 is a fragmentary enlarged detail sectional view taken substantially along the center line of a modified form of construction, showing the ring in full lines in one position of adjustment, and in dotted lines in the secondary position of adjustment, and Figure 13 is a view similar to Figure 12, showing further details of construction, after the ring has been closed through the membrane between the nostrils of the animal to be treated.

Similar reference characters refer to similar parts throughout the several views of the drawings.

Having reference now to the drawing in detail and particularly referring to Figure 1, there is generally indicated at 10 a cylindrical member internally threaded as at 11 and 12 in opposite directions. The member 10 has rotatably mounted relative thereto a second cylindrical member 13.

Tubular member 10 is closed at its upper portion by means of a closure plug member 15, which includes an annulus 16, provided with an elongated rectangular opening 16a, within which is slidably positioned a member 17 terminating at its upper extremity in a hook 18. Member 17 is adapted to engage between the bifurcated and tongue parts 19 of a pivotally connected split ring 20, which latter includes a pointed projection 21, and a recess 22 for the reception of the point 21.

The hook 18 is adapted to bear down upon the split tongue and bifurcated portions 19 of ring 20 when spring pressure is applied thereto, in a manner to be more fully described hereinafter.

Closure plug 15 includes a pair of diverging arms 25, each of which is provided at its terminus with a fulcrum point 26, adapted to bear against the outer sides of the split ring 20, when the latter is in open position.

Interiorly positioned within tubular member 10 is a plug 30, threaded onto the reverse threads 12 of the interior of the member 10, and including a shoulder 31, against which bears a spring 32. The spring 32 at its opposite end bears against a plate 33 which includes an annulus 34 extending inwardly of the spring 32, and which is adapted upon release, in a manner to be more fully described hereinafter, to permit the release of the spring 32 to bias downwardly a member, also to be more fully described hereinafter, which will cause the downward depression of hook 18 to drive the point 21 firmly into the recess 22, through the nostrils of an animal such as a bull or the like.

The plug 30 is provided with a downwardly projecting skirt 30'. Positioned interiorly of the skirt 30' is a ring 35, provided with a pair of oppositely projecting lugs 36, which lugs are adapted to engage in slots 37 of T-shaped configuration, including elongated bottom portions 38 in cylinder or tubular member 13. The ring 35 is also provided with an internal peripheral groove formed by a flange 38a on which lugs 39 carried by plate 33 and annulus 34 rest. The flange 38a has oppositely disposed notches 38' and upon partial rotation of member 13 and ring 35, slots 38' will be brought into registration with lugs 39, thereby causing release of spring 32. The interior of plug 30 which has the depending annular skirt 30' is also provided with inclined slot members 39' which in turn are provided with stops 40 whereby upon rotation of the member 13, ring 35 may be rotated to engage within the slots 39' and lock in such position.

The lower end of the member 17 is threaded as at 45, and is adapted to be engaged by a threaded collar 46, against which seats the member 33, the assembly being held in position by means of a stop pin 47 which extends through suitable bores in member 46 and rod 17.

The sequence of operation is best shown in Figures 9, 10 and 11, wherein as in Figure 9, which corresponds to the position of the parts disclosed in Figure 6, the ring is shown in open position and steadied upon fulcrum points 26. In this position, the slots and lugs of the associated rings retain the spring 32 in compressed position. Upon further rotation of member 13, which it may here be pointed out is provided with a knurled handle 50, the movement of the lugs to the position shown in Figure 10 and subsequently in Figure 11, to permit the release of the lugs 39 through their associated slots 38', releases spring 32, to enable the same to snap down the member 33 on the collar 46, which in turn forces the rod 17 downwardly, thus snapping the ring to closed position as disclosed in Figure 4, and clamping the same firmly through the nostrils of the bull or other animal to be ringed.

Figures 12 and 13 disclose a modified form of the device wherein there is disposed exteriorly a tube 10a threaded as at 11a and 12a in opposite directions, and provided with an internal plug 13a similar to that disclosed in the preceding modification. However, in the instant application the arms 56 are pivotally connected as at 56 to the plug 13a, and in consequence, exert a different torsional directional pressure upon the ring 20a to close the same as indicated in Figure 13.

The arrangements of parts 33, 46, and the spring 32 are substantially identical to that disclosed in the foregoing modification. Supplemental screws 60 are also provided, and have thereon tension springs 61 seated in suitable recesses in plug 30a to retain the parts in related assembly.

After an operation of the device, the parts of the device will be in the position shown in Figures 4 and 13. When it is desired to reset the device after a ring has been positioned in a bull's nose, the parts of the device being in the position shown in Figure 4, tube 13 is rotated until the lugs 36 are disengaged from the inclined slots 39', the lugs remaining seated in the recesses 38, and the tube 13 moved downwardly to the position shown in dotted lines in Figure 6. Tube 13 is then rotated until the lugs 39 of the member 33 pass through the apertures 38' in the ring 35 to engage over the flange 38a. Additional rotation of the sleeve 13 will cause the ring 35 and the member 33 to act as an integral unit, whereupon sleeve 13 is forced inwardly to compress spring 32, until the lugs 36 are in a position to reengage the inclined slots 39', whereupon partial rotation of the sleeve 13 will engage the sleeve 13 effectively with the skirt 30', retaining the spring in the compressed position of Figure 1. At this point an additional ring 20 in open position is seated on the shoulders 26, and engaged by the hook 18. The device is now ready for reuse.

From the foregoing it will now be seen that there is herein provided an improved device for accomplishing all the objects of this invention, and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative and not in a limiting sense.

What is claimed is:

1. In a ringing device for animals, a tubular member having its interior provided with reversely disposed upper and lower threads, a closure plug engaging the upper of said threads and having an aperture therethrough, a second plug engaging said lower threads and having an aperture therethrough in alignment with said first mentioned aperture, a pair of fulcrum points extending outwardly of said plug wherein the sides of a separable pivoted ring are adapted to seat, a hooked rod extending through said aperture engaging said ring at the pivot point thereof whereby retractive movement of said rod will close said ring through the nostrils of an animal, a rotatable sleeve engaging said second plug and spring means within said second plug rotatable to a position to retract said rod.

2. In a ringing device for animals, a tubular member having its interior provided with reversely disposed upper and lower threads, a closure plug engaging the upper of said threads and having an aperture therethrough, a second plug engaging said lower threads and having an aperture therethrough in alignment with said first mentioned aperture, a pair of fulcrum points extending outwardly of said plug wherein the sides of a separable pivoted ring are adapted to seat, a hooked rod extending through said aperture engaging said ring at the pivot point thereof whereby retractive movement of said rod will close said ring through the nostrils of an animal, a rotatable sleeve engaging said second plug, spring means within said second plug rotatable to a position to retract said rod, and latch means between said tube and said spring operable upon rotation of said sleeve to release said spring.

3. In a ringing device for animals, a tubular member having its interior provided with reversely disposed upper and lower threads, a closure plug engaging the upper of said threads and having an aperture therethrough, a second plug engaging said lower threads and having an aperture therethrough in alignment with said first mentioned aperture, a pair of fulcrum points extending outwardly of said plug wherein the sides of a separable pivoted ring are adapted to seat, a hooked rod extending through said aperture engaging said ring at the pivot point thereof whereby retractive movement of said rod will close said ring through the nostrils of an animal, a rotatable sleeve engaging said second plug, spring means within said second plug rotatable to a position to retract said rod, latch means between said tube and said spring operable upon rotation of said sleeve to release said spring, and a handle for rotating said latch means.

4. In a ringing device for animals, a tubular member having its interior provided with reversely disposed upper and lower threads, a plug engaging the upper of said threads and having an aperture therethrough, a pair of fulcrum points extending outwardly of said plug wherein the sides of a separable pivoted ring are adapted to seat, a hooked rod extending through said aperture engaging said ring at the pivot point thereof whereby downward movement of said rod will close said ring through the nostrils of an animal, spring means within said tube retracting said rod, latch means between said tube and said spring operable to release said spring, and a handle for rotating said latch means, said latch means including a tubular sleeve having slots therein threaded to said lower threads, an annulus, lugs on said annulus engaging in said slots, rotation of said handle serving to rotate said annulus to release the engagement of said lugs in said slots.

5. In a ringing device for animals, a tubular member having its interior provided with reversely disposed upper and lower threads, a plug engaging the upper of said threads and having an aperture therethrough, a pair of fulcrum points extending outwardly of said plug wherein the sides of a separable pivoted ring are adapted to seat, a hooked rod extending through said aperture engaging said ring at the pivot point thereof whereby downward movement of said rod will close said ring through the nostrils of an animal, spring means within said tube retracting said rod, latch means between said tube and said spring operable to release said spring, and a handle for rotating said latch means, said latch means including a tubular sleeve having slots therein threaded to said lower threads, an annulus, lugs on said annulus engaging in said slots, rotation of said handle serving to rotate said annulus to release the engagement of said lugs in said slots, and a second annulus member connected to said rod said spring abutting thereagainst, lugs on said second annulus member, said first annulus having slots therein within which said last mentioned lugs engage, and an internal groove in said first annulus wherein said last mentioned lugs may move, whereby rotation of said first mentioned annulus disengages said last mentioned lugs to permit said spring member to bias said second member downwardly to move said rod and hence clamp said ring.

6. In a ringing device for animals, a tubular member having its interior provided with reversely disposed upper and lower threads, a closure plug engaging the upper of said threads and having an aperture therethrough, a second plug engaging said lower threads and having an aperture therethrough in alignment with said first mentioned aperture, a pair of fulcrum points extending outwardly of said plug wherein the sides of a separable pivoted ring are adapted to seat, a hooked rod extending through said aperture engaging said ring at the pivot point thereof whereby retractive movement of said rod will close said ring through the nostrils of an animal, a rotatable sleeve engaging said second plug, and spring means within said second plug rotatable to a position to retract said rod, arms extending from said plug, said fulcrum points being positioned at the end of said extending arms, said arms being pivotally connected to the top of said plug.

7. In a ringing device for animals, a tubular member having its interior provided with reversely disposed upper and lower threads, a plug engaging the upper of said threads and having an aperture therethrough, a pair of fulcrum points extending outwardly of said plug wherein the sides of a separable pivoted ring are adapted to seat, a hooked rod extending through said aperture engaging said ring at the pivot point thereof whereby downward movement of said rod will close said ring through the nostrils of an animal, spring means within said tube retracting said rod, latch means between said tube and said spring operable to release said spring, and a handle releasing said latch means, said latch means including a tubular sleeve having slots therein threaded to said lower threads, an annulus, lugs on said annulus engaging in said slots, rotation of said handle serving to rotate said annulus to release the engagement of said lugs in said slots, and a second annulus member connected to said rod said spring abutting thereagainst, lugs on said second annulus member, said first annulus having slots therein within which said last mentioned lugs engage, and an internal groove in said first annulus wherein said last mentioned lugs may move, whereby rotation of said first mentioned annulus disengages said last mentioned lugs to permit said spring member to bias said second annulus member downwardly to move said rod and hence clamp said ring and arms extending from said plug, said fulcrum points being positioned at the end of said extending arms, said arms being pivotally connected to the top of said plug.

No references cited.